United States Patent [19]
Becker

[11] 3,810,459
[45] May 14, 1974

[54] TRANSCUTANEOUS BLOOD VESSEL PROBE WITH RELOCATION MARKER

[75] Inventor: Gerald O. Becker, Blackstone, Mass.

[73] Assignee: American Optical Corporation, Southbridge, Mass.

[22] Filed: Apr. 27, 1972

[21] Appl. No.: 250,090

[52] U.S. Cl. ............................ 128/2.05 Z, 128/2 V
[51] Int. Cl. .................................................. A61b 5/02
[58] Field of Search .......... 128/2.05 Z, 2.05 R, 2 V, 128/2 R, 2.06 E, 2.1 E, DIG. 4, 24 A, 406

[56] References Cited
UNITED STATES PATENTS

| | | | |
|---|---|---|---|
| 2,763,153 | 9/1956 | Simjian | 128/24 A X |
| 2,208,023 | 7/1940 | Ellis | 128/2.1 E X |
| 3,534,733 | 10/1970 | Phipps et al. | 128/2.1 E |
| 2,318,207 | 5/1943 | Ellis | 128/404 |
| 2,549,836 | 4/1951 | McIntyre et al. | 128/DIG. 4 X |
| 2,580,628 | 1/1952 | Welsh | 128/404 |
| 3,502,070 | 3/1970 | Bliss | 128/2 B |

FOREIGN PATENTS OR APPLICATIONS
274,612   7/1951   Switzerland .................. 128/DIG. 4

Primary Examiner—Kyle L. Howell
Attorney, Agent, or Firm—H. R. Berkenstock, Jr.; William C. Nealon

[57] ABSTRACT

An external physiological sensor probe in which a transducer responsive to in vivo physiological signals is placed in an appropriate position on the body. The transducer is mounted in a housing to permit placement of the transducer next to the skin or in contact with the skin if necessary. A marker member or element is slideably mounted on the transducer housing and resiliently urged to a position distal of the transducer. The marker member acts as a handle and may be placed in contact with the body upon application of a certain predetermined force. The marker member produces an indication on the body as to the position of probe as well as its alignment thereby enabling its positioning in the exact same location at a remote time.

4 Claims, 3 Drawing Figures

PATENTED MAY 14 1974 3,810,459
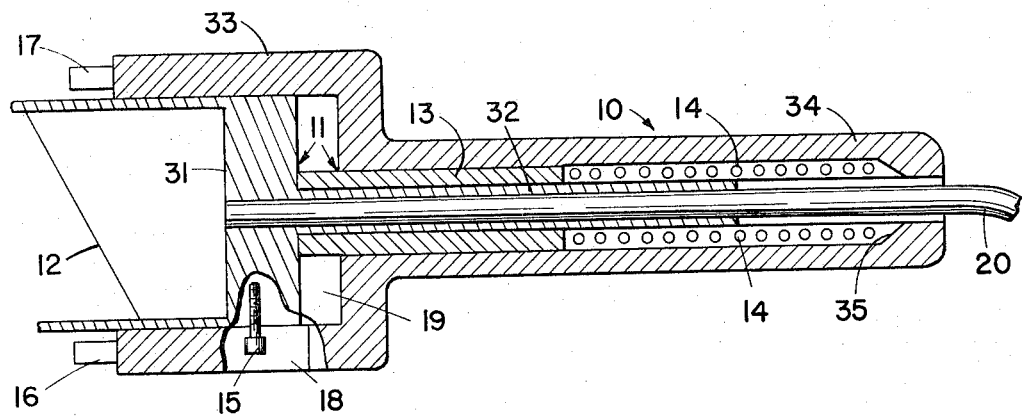
FIG. 1
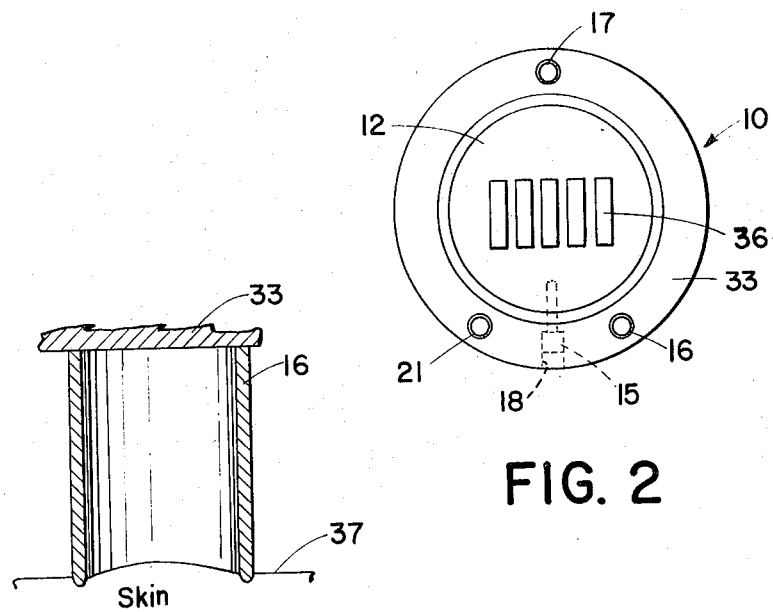
FIG. 2
FIG. 3

TRANSCUTANEOUS BLOOD VESSEL PROBE WITH RELOCATION MARKER

BACKGROUND OF THE INVENTION

The present invention finds application and is especially suited for use with extra corporeal physiological transducers for which the exact location and placement on the body is important.

The obtaining of physiological signals by means of external transducers or sensors has become a tool of great importance in the diagnosing of pathological conditions particularly in their incipient stage. In the instance of the cardiovascular system, but certainly not limited to such body signals, the obtaining of information from external sensors placed upon the body is finding ever broadening use. This information is enabling the physician to determine and keep track of the physiological reactions of the patient during varying conditions and environments.

If the information is to be reliable and susceptible of comparative analysis over extended periods of time it is essential that the environmental as well as artifactual conditions be known. Taking for example the use of ultrasonic transducers in the measurement of blood flow parameters and vessel dimensions and movements, any significant alteration of the transducer with respect to the vessel will produce apparent changes in the information obtained thereby rendering the data questionable in value and content. This is not only true in short term testing conditions as is normally performed in a physician's office or laboratory but also true in the performance of long range testing of the patient's physiological responses to varying conditions.

Thus, it is an object of the Applicant's invention to provide an external physiological sensor probe overcoming the aforementioned problem. It is another object of the Applicant's invention to produce an improved physiological sensor. It is yet another object of the Applicant's invention to provide a physiological sensor probe capable of repeated positioning and alignment on the patient's body.

SUMMARY OF THE INVENTION

The Applicant's invention contemplates an external physiological sensor probe incorporating a transducer responsive to in vivo physiological signals when placed in proper position on the patient's body. The transducer element is mounted on the proximal end of a housing to enable placement of the transducer either in actual physical contact with the patient's body or in close proximity to the skin. A marker member is slideably engaged with this housing and a resilient member urges the marker member toward the distal end of the housing and away from the transducer element. The marker member is brought in contact with the body to impress location indicia thereon upon application of a predetermined force to the marker member producing relative motion between it and the housing.

In conducting physical examinations of a cardiovascular nature, the physician obtains signals from various vessels throughout the body and thus obtains information relative to the patient's condition. If recurring tests under varying conditions or environments are needed, the transducer must be placed in substantially the same location on each occasion. Failure to so properly locate causes misalignment of the transducer sensing patterns with respect to the vessel under interrogation and the artifacts thus produce ambiguities and perturbations in the data derived. The Applicants's invention obviates this by providing for exact relocation of the transducers with respect to the vessels by the placement of alignment indicia upon the body.

For a better understanding of the Applicant's invention reference is had to the following description taken in connection with the accompanying drawings. The scope of the invention is pointed out in the appended claims.

BRIEF DESCRIPTION OF THE DRAWINGS

FIG. 1 is a partial cross-sectional view of a medical sensor probe embodying the Applicant's invention.

FIG. 2 is a side elevational view of the proximal end of the probe showing the physiological transducer.

FIG. 3 is a fragmentary cross-sectional schematic view of a marker element in contact with the body of a patient.

Like symbols and identification are used to identify the same parts on the different drawings. The embodiments shown are intended to be illustrative of the Applicant's invention, and in no way delimiting of its scope.

DESCRIPTION OF THE PREFERRED EMBODIMENT

FIG. 1 shows an extra corporeal sensor probe for diagnostic application. A transducer element 12 of the ultrasonic type is mounted in the proximal end 31 of a housing 11 for placement against the body of the patient or in juxtaposition to the skin.

The proximal end 31 of housing 11 constitutes an essentially cylindrical cup type member. The cavity of this member is dimensioned so as to accept insertion of the transducer element 12 and to provide adequate mechanical support and acoustical tuning therefor. The transducer element 12 is shown at an angle to the axis of housing 11, which angle may be varied depending upon the type of transducer element employed as well as the application intended. Normally transducer element 12 is mounted on a plastic preferably nylon bushing prior to its insertion within the cavity of housing 11 but may be mounted therein in any suitable manner. Housing 11 further incorporates a stem element 32 perpendicularly mounted to the cup member 31. It is essentially a thin wall tubing press fitted within a complementary hole in the cup member 31 rear wall. Housing 11 is fabricated from aluminum but once again any suitable material may be selected. The channel provided by the hollow stem and the complementary hole in the rear wall of cup member permits passage of electrical conductors 20 from remote external equipment to the transducer 12 for communication and transmission of signals.

The marker member 10 constitutes an outer shell to housing 11. Its internal geometry is configured to be in complementary slideable engagement with stem 32 and cup member 31 of housing 11. The outer shape and dimensions of marker member 10 substantially conform to the geometry of housing 11; its stem portion 34 however extending beyond the end of housing stem 32 thus acting as a handle or finger grasping portion. The internal bore of the handle portion 34 is of greater diameter than that of stem 32 and is maintained in contact with stem 32 by a sleeve member 13 mounted on stem 32.

Sleeve 13 acts as a slide bushing between stem 32 and the internal surfaces of the handle portion 34.

Since sleeve 13 is not coextensive with handle portion 34, an annular void is created between the distal end of handle 34 and the upper portion or shoulder of sleeve 13. A coil or helical spring 14 is inserted within this void and captured between the shoulder formed by sleeve 13 and an upper shoulder 35 on the internal distal end of handle portion 34. Thus, upon insertion of housing 11 including sleeve 13 into marker member 10 the helical spring 14 is captured therebetween and urges the marker member 10 in a direction away from the proximal end of housing 11 containing transducer 12. In order to prevent subsequent disengagement of housing 11 from marker member 10 a radially extending abutment element in the form of a set screw 15 is inserted into the outer wall of cup member 31. A complementary slot or key way 18 is machined into the wall of the complementary cup portion 33 of marker member 10 and the abutment of set screw 15 on the internal surface of key way 18 prevents total disengagement of housing 11 from marker member 10 and limits the relative travel of these elements to a predetermined distance.

Helical spring 14 normally urges marker member 10 away from the housing 11 and holds set screw 15 in a butting relationship to the internal surface of channel or key way 18. With the proximal end of cup member 31 or the element 12 in contact with the body application of a force sufficient to overcome the force generated by the spring 14 produces a relative forward motion of marker member 10 with respect to housing 11. This forward movement is limited by the contact of marker elements 16, 17 and 21 located on the end portion of marker cup 33, on the body of the patient. And the ultimate travel of marker member 10 is limited by the engagement of complementary surfaces formed on the upper face of cup member 31 and the lower internal surface of marker cup member 33. Thus, the total permissable travel is limited to a distance determined by the space 19.

Marker elements 16, 17 and 21 are typical of those that might be located about the periphery of the end of marker cup portion 33 and in this particular embodiment a total of three marker elements are utilized. FIG. 3 shows the relative placement of these elements 16, 17, and 21 about the annular end of cup member 33. The transducer element 12 is shown as containing six transmitting and receiving elements, typically element 36. Obviously, the placement of the 3 marker elements in the manner indicated permits an exact alignment of the transducer element 36 with respect to the body. To fully appreciate this advantage, it must be realized that a transcutaneous blood flow probe of the type illustrated uses piezo-electric crystals to emit and receive ultrasonic vibrations. The transmitting crystals emit vibrations in a frequency of the range between 1 and 20 megahertz and this energy is back scattered by the walls of the vessels undergoing interrogation and the blood cells flowing therein. The velocities of the cells are reflected in a doppler shifted frequency of the back scattered energy and the frequency shifts are used for obtaining blood flow information as well as data on the artery vein or vessel of significance. Any relative movement between the transducer or displacement of the transducer with respect to the vessel causes the creation of artifacts in the information and its distortion.

This alignment problem is overcome simply by the physician or technician applying sufficient force to the handle portion 34 moving it the predetermined travel distance 19. The marker elements 16, 17 and 21 protrude past the proximal end portion of housing 11 and contact the body or skin of the patient thereby impressing location indicia.

FIG. 3 demonstrates the contact of a typical element 16 with the skin 37 of the patient. Marker element 16 is a tubular member, the walls of which press into the skin and with the relief provided by the center opening produces a dimple mark. The dimple mark then remains upon the body for a sufficient time to enable removal and subsequent replacement of the transducer probe in the exact previous location. In instances of short intervals between removal and replacement of the probe, no more than the simple transient dimple mark is necessary for alignment purposes; however, where longer periods may be involved before replacement of the probe permanent or semi-permanent indicia may be required. To this purpose it would take no more than oridinary skill in the art to provide means whereby a dye or other suitable marking material may be placed upon the body by the elements 16, 17 and 18 or other similar marker elements. A simple stratagem would be to use an ink pad in conjunction with the probe bringing the elements 16, 17 and 21 in contact with the pad prior to application to the body of the patient.

The Applicant's invention provides a simple device of great convenience to the physician or medical technician in performing diagnostic tests upon patients. The invention permits the positive location and alignment of external sensing transducers, the information from which is gaining ever greater importance in determining the condition of patients. It is intended that the embodiment shown and the description thereof be illustrative of the Applicant's invention and that those modifications and changes apparent to those ordinarily skilled in the art are to come within the scope of the invention.

I claim:

1. An external physiological sensor probe comprising:

a transducer means responsive to in-vivo physiological signals;

a substantially cylindrical housing having a cup member with a cavity therein disposed at one end of said housing and in which said transducer means is mounted, and having an axially aligned stem member of generally smaller diameter than said cup member extending generally away from said cavity and cup member, said cup member further having a limit abutment element radially extending therefrom;

a substantially cylindrical marker member slidably engaging at least one of said stem and cup member of said housing for placing location and alignment indicia on said body, said marker member having a complementary portion to said cup member and slidably receiving said cup member therein and a handle portion having a bore therein slidably receiving said stem member therein, said complementary portion having an axial slot therein into which said limit abutment element extends for limiting relative motion of said marker member and said housing, said marker member further including marking elements disposed in said portion complementary to said cup member and axially extending therefrom;

a resilient means urging said transducer distally of said marker member so that marking elements are adjacent said transducer means only upon application of a force on said marker member overcoming the resiliency of said resilient means; and a tubular sleeve interposed between said stem member and the bore of said handle portion of said marker member, said sleeve including means to retain said resilient means.

2. The probe of claim 1 wherein said handle portion is a hollow tubular member, said handle portion has a through aperture at the end of its bore, axially aligned with said hollow tubular member and electrical conductors for the transmission of the electrical systems pass through said handle portion said stem member, and said aperture for connection with said transducer.

3. The probe of claim 1 wherein said marking elements are small tubular members adapted to produce a dimpled effect on said body when placed in contact therewith and are arrayed peripherally about said marking means in a predetermined pattern so as to produce an indicia indicative of the alignment and location of said transducer sensor on said body.

4. The probe of claim 1 wherein said marking elements include ink dispensing means operable to produce an ink indicia on said body.

* * * * *